United States Patent
Beaman et al.

(10) Patent No.: US 10,547,454 B2
(45) Date of Patent: Jan. 28, 2020

(54) MANAGING IN-FLIGHT TRANSFER OF PARCELS USING BLOCKCHAIN AUTHENTICATION

(71) Applicant: International Business Machines Corporation, Armonk, NY (US)

(72) Inventors: Brian S. Beaman, Apex, NC (US); Eric V. Kline, Rochester, MN (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 15/855,399

(22) Filed: Dec. 27, 2017

(65) Prior Publication Data
US 2019/0199534 A1 Jun. 27, 2019

(51) Int. Cl.
*H04L 9/32* (2006.01)
*B64D 1/00* (2006.01)
*G06Q 10/08* (2012.01)
*G07C 5/00* (2006.01)
*B64C 39/02* (2006.01)

(52) U.S. Cl.
CPC .............. *H04L 9/3247* (2013.01); *B64D 1/00* (2013.01); *G06Q 10/083* (2013.01); *G07C 5/008* (2013.01); *B64C 39/024* (2013.01); *B64C 2201/128* (2013.01)

(58) Field of Classification Search
CPC ...... H04L 9/3247; B64D 1/00; G06Q 10/083; G07C 5/008; B64C 39/024; B64C 2201/128
See application file for complete search history.

(56) References Cited

U.S. PATENT DOCUMENTS

| | | | |
|---|---|---|---|
| 8,645,005 | B2 | 2/2014 | Elkins |
| 9,561,852 | B1 | 2/2017 | Beaman et al. |
| 9,607,522 | B2 | 3/2017 | Downey et al. |
| 9,619,776 | B1 * | 4/2017 | Ford ................ G06Q 10/08355 |
| 9,871,772 | B1 * | 1/2018 | Weinstein ............ H04L 63/0435 |
| 10,158,480 | B1 * | 12/2018 | Winklevoss ........... H04L 9/3239 |
| 10,246,187 | B2 * | 4/2019 | Cantrell ................ B64C 39/024 |
| 10,274,952 | B2 * | 4/2019 | Cantrell ................ B64C 39/024 |
| 2014/0025229 | A1 | 1/2014 | Levien et al. |
| 2014/0032034 | A1 * | 1/2014 | Raptopoulos ........ G08G 5/0069 701/25 |
| 2016/0068265 | A1 * | 3/2016 | Hoareau ................ G05D 1/102 701/3 |
| 2016/0107750 | A1 | 4/2016 | Yates |
| 2016/0239804 | A1 | 8/2016 | Buchmueller et al. |

(Continued)

OTHER PUBLICATIONS

Calatayud. The Connected Supply Chain: Enhancing Risk Management in a Changing World. Inter-American Development Bank, 2017. (Related).

*Primary Examiner* — Techane Gergiso

(57) ABSTRACT

An example operation may include one or more of receiving a request to authorize an in-flight transfer of a parcel between a source unmanned aerial vehicle (UAV) and a target UAV, authenticating, via a blockchain, an identity of the source UAV and an identity of the target UAV based on one or more predefined keys included in the request, and in response to the blockchain authentication being successful, initiating delivery of the parcel from the source UAV to the target UAV while one or more of the source UAV and the target UAV are in-flight.

20 Claims, 7 Drawing Sheets

(56) References Cited

U.S. PATENT DOCUMENTS

| | | |
|---|---|---|
| 2017/0190422 A1* | 7/2017 | Beaman .................. B64D 1/00 |
| 2017/0238234 A1* | 8/2017 | Dowlatkhah ......... H04W 8/005 |
| | | 455/517 |
| 2018/0012433 A1* | 1/2018 | Ricci ....................... H04L 9/321 |
| 2018/0074523 A1* | 3/2018 | Cantrell ................. G05D 1/104 |
| 2018/0144642 A1* | 5/2018 | High ..................... H04W 4/021 |
| 2019/0158597 A1* | 5/2019 | Evans .................... H04L 67/12 |

\* cited by examiner

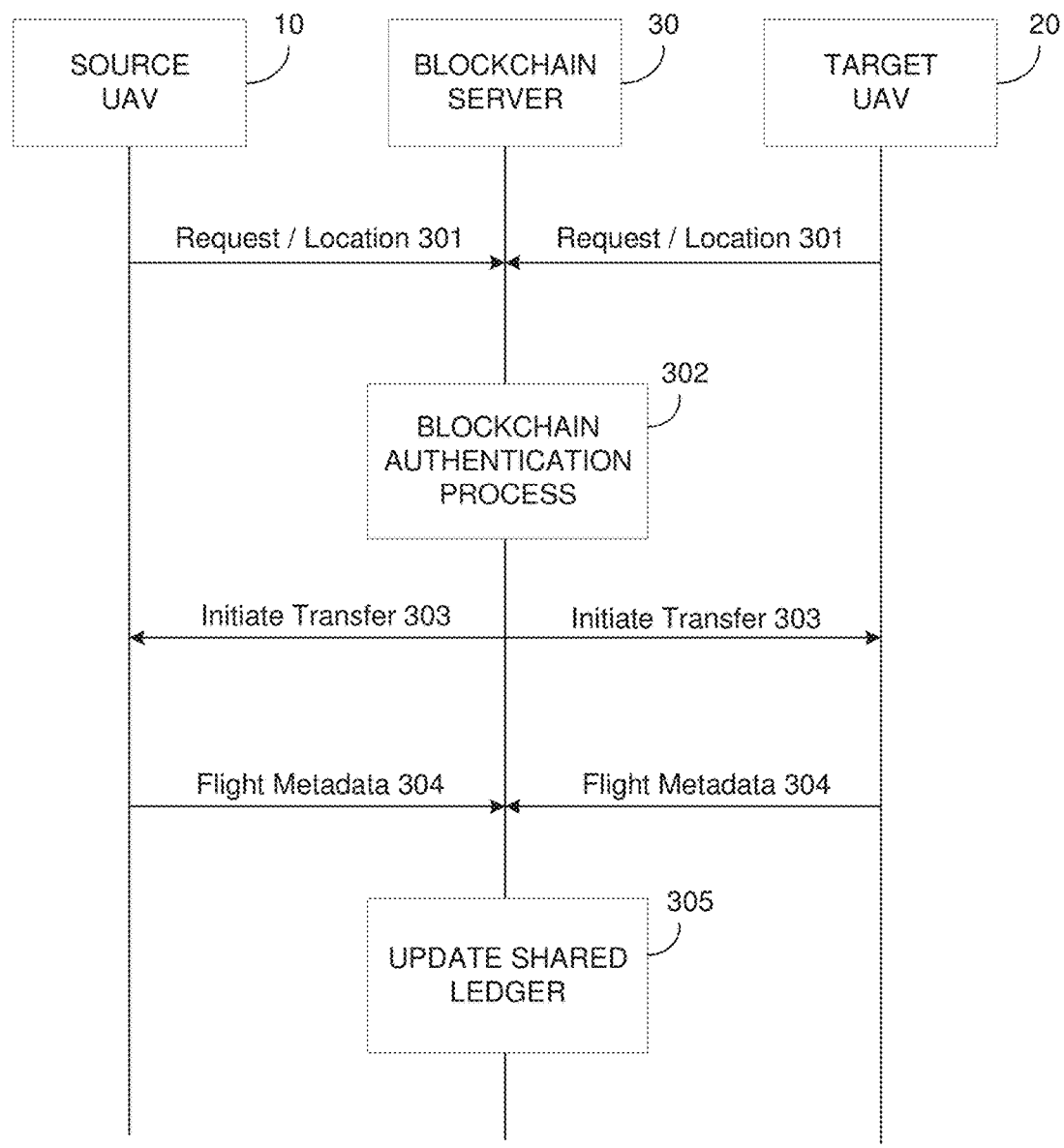

MANAGING IN-FLIGHT TRANSFER OF PARCELS USING BLOCKCHAIN AUTHENTICATION

TECHNICAL FIELD

This application generally relates to blockchain transactions, and more particularly, to managing in-flight transfer of parcels using blockchain authentication.

BACKGROUND

A blockchain may be used as a public ledger to store information such as digital assets and the like. Because any individual or entity can often provide information to a blockchain, this information should be reviewed and confirmed. This operation is known as consensus. There are two types of consensus centralized and decentralized. Centralized consensus includes one central database that is used to rule transaction validity. A decentralized consensus transfers authority and trust to a decentralized network and enables its nodes to continuously and sequentially record their transactions on a public "block", creating a unique "chain" referred to as a blockchain. Cryptography, via hash codes, is used with a blockchain to secure an authentication of a transaction source and removes the need for a central intermediary.

Autonomous drones which include unmanned aerial vehicles (UAVs) and remotely piloted aircraft (RPA), may be used by private and corporate entities subject to pending to regulations implemented by various aviation authorities such as the Federal Aviation Admiration (FAA). Proposed uses for drones include, but are not limited to, city ordinance enforcement, government functions, package delivery, and image capturing. Therefore, it is envisioned that users could purchase drones to achieve a certain set of needs or tasks such as delivering a parcel or other payload from a warehouse to a customer.

Recent technological improvements have made it possible for a drone to transfer a parcel to another drone while the drones are in-flight. By performing an in-flight transfer it is possible to accommodate restrictions on location based permits of drone travel, available power, long distance travel, and the like. For example, the transfer can be performed to replace a drone having decreasing health using a drone with more health. As another example, a seller's drone can transfer a parcel to a buyer's drone. As a result, drones do not have to land to transfer packages there between. However, drone security is an issue when dealing with multiple entities during the transfer process.

SUMMARY

In one example embodiment, provided is a method that includes one or more of receiving a request to authorize an in-flight transfer of a parcel between a source unmanned aerial vehicle (UAV) and a target UAV, authenticating, via a blockchain, an identity of the source UAV and an identity of the target UAV based on one or more predefined keys included in the request, and in response to the blockchain authentication being successful, initiating delivery of the parcel from the source UAV to the target UAV while one or more of the source UAV and the target UAV are in-flight.

In another example embodiment, provided is a computing system that includes one or more of a network interface configured to receive a request to authorize an in-flight transfer of a parcel between a source unmanned aerial vehicle (UAV) and a target UAV, and a processor configured to perform one or more of authenticate, via a blockchain, an identity of the source UAV and an identity of the target UAV based on one or more predefined keys included in the request. In response to the blockchain authentication being successful, the processor may be further configured to control the network interface to transmit a message to one or more of the source UAV and the target UAV to initiate delivery of the parcel from the source UAV to the target UAV while one or more of the source UAV and the target UAV are in-flight.

A non-transitory computer readable medium having stored therein program instructions that when executed cause a computer to perform one or more of receiving a request to authorize an in-flight transfer of a parcel between a source unmanned aerial vehicle (UAV) and a target UAV, authenticating, via a blockchain, an identity of the source UAV and an identity of the target UAV based on one or more predefined keys included in the request, and in response to the blockchain authentication being successful, initiating delivery of the parcel from the source UAV to the target UAV while one or more of the source UAV and the target UAV are in-flight.

BRIEF DESCRIPTION OF THE DRAWINGS

For a proper understanding of the examples described herein, reference should be made to the enclosed figures. It should be appreciated that the figures depict only some embodiments and are not limiting of the scope of the present disclosure.

FIG. 3 is a sequence diagram illustrating a blockchain authentication process between UAVs in accordance with an example embodiment.

DETAILED DESCRIPTION

Figure 1:
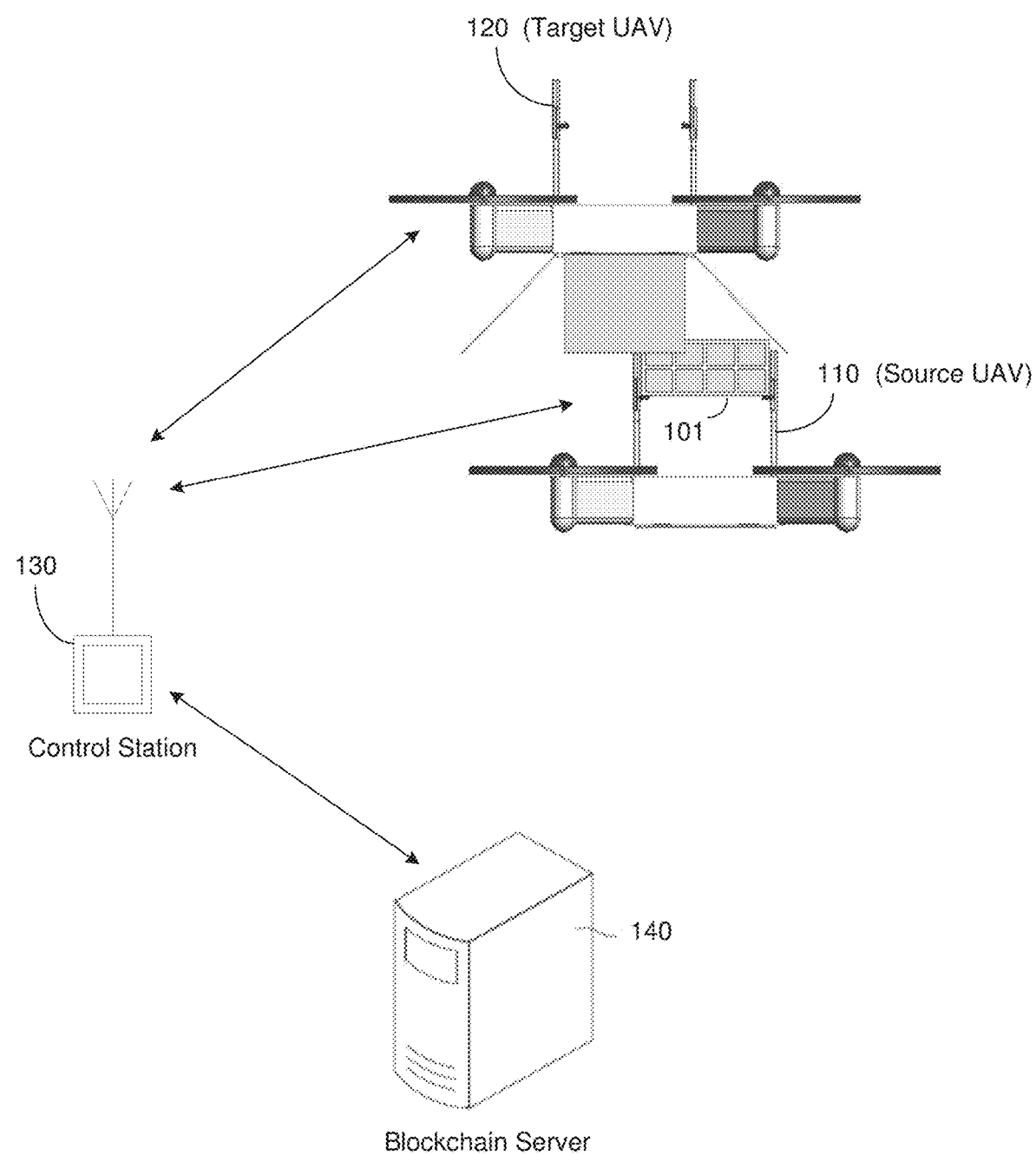
FIG. 1 is a diagram illustrating an in-flight parcel transfer system including two UAVs in accordance with an example embodiment.

It will be readily understood that the components of the present application, as generally described and illustrated in the figures herein, may be arranged and designed in a wide variety of different configurations. Thus, the following detailed description of the embodiments of one or more of a method, apparatus, non-transitory computer readable medium and system, as represented in the attached figures, is not intended to limit the scope of the application as claimed, but is merely representative of selected embodiments.

The features, structures, or characteristics as described throughout this specification may be combined in any suitable manner throughout the embodiments. In addition, the usage of the phrases such as "example embodiments", "some embodiments", or other similar language, throughout this specification is used to indicate that a particular feature, structure, or characteristic described in connection with the embodiment may be included in the one or more embodiment and is not to be construed as being omitted from other embodiments. Thus, appearances of the phrases "example embodiments", "in some embodiments", "in other embodiments", or other similar language, may be used to refer to the same group of embodiments, and the described features, structures, or characteristics may be combined in any suitable manner in one or more embodiments.

In addition, while the term "message" may be used in the description of embodiments, the application may be applied to many types of network data, such as, packet, frame, datagram, etc. The term "message" or "request" may include packet, frame, datagram, and any equivalents thereof. Furthermore, while certain types of messages and signaling requests may be depicted in example embodiments they are not limited to a certain type of message, and the application is not limited to a certain type of signaling.

The instant application in one embodiment relates to blockchain transactions, and in another embodiment relates to managing in-flight parcel transfers between a source drone and a target drone using blockchain authentication.

The example embodiments are directed to a blockchain authentication process between two drones (e.g., unmanned aerial vehicles, submersibles, walking robots, rolling robots, etc.) performing an in-flight transfer of a parcel. The parcel described herein may include any desired payload such as a package holding consumer products, goods, components, parts, or any other desired payload. For various reasons, drones are limited in their travel capacity. For example, a drone may have a travel permission limit, battery life limits, drone specification limits, and the like, which prevent or otherwise hinder the drone from travelling an entire delivery route. Recent advancements to drones enable two drones to exchange a payload while in-flight meaning that the drones do not have to land in order to transfer a payload. In addition to travel and health restrictions, in-flight parcel exchange needs to be kept secure to prevent parcels from being hijacked.

According to various embodiments, two drones may exchange a parcel while one or more of the drones is in-flight or in-transit. To enhance security of the exchange, the drones may request a blockchain authentication be performed for securely identifying each of the drones while in-flight and prior to or during the transfer of the parcel. The blockchain may be stored by one or more of a control station which communicates with the drones, a remote server connected to the control station via a network, the drones themselves, and the like. The blockchain (or blockchain host device) may assign private keys to all drones within a predetermined area and prior to a parcel exchange process.

When two drones come within proximity to one another, a blockchain authentication may be performed by a blockchain host device. Here, the proximity may be determined from geo-location messages periodically or continuously received from the drones and when the two drones are determined to be within a predetermined proximity, the blockchain may initiate the authentication process. As another example, the blockchain may receive an express request from one or more drones to perform the authentication process. The request may be issued automatically based on the drone proximity or based on a user operating the drone. Accordingly, the blockchain authentication may be performed based on the unique private keys that are assigned to each of the drones. In response to the authentication being successful, the blockchain may initiate transfer of the parcel from a source drone to a target drone, while the drones are in-flight. In addition, in-flight metadata may be collected by each of the drones and provided to the blockchain server based on drone attributes. Accordingly, the blockchain server may update a shared public ledger with the in-flight metadata thereby enhancing security of the transaction.

FIG. 1 illustrates an in-flight parcel transfer system 100 in accordance with an example embodiment. Referring to FIG. 1, the system 100 includes a parcel 101 being carried by a source UAV 110 and a target UAV 120 that is an intended recipient for in-flight transfer of the parcel 101 being carried by the source UAV 110. Rather than one drone performing a parcel delivery process, the example embodiments provide for in-flight transfer of a parcel or parcels from a source drone to a target drone thereby enabling multiple drones to share in the delivery process such as between a sender and a recipient (e.g., a buyer and a seller, etc.) The system 100 also includes a control station 130 that may communicate with both of the source UAV 110 and the target UAV 120 via wireless communications (e.g., satellite, cellular, etc.) Here, the source UAV 110 and the target UAV 120 may communicate with each other via the control station 130. In some embodiments, the source UAV 110 and the target UAV 120 may communicate directly with one another.

The system 100 also includes a remote blockchain server 140 that is connected to the control station 130 via a wired and/or wireless network. According to various aspects, the remote blockchain server 140 may store a blockchain for in-flight UAV authentication. The system 100 provides for blockchain enabled in-flight transfer of the parcel 101 among aerial drones. For example, one or more private keys may be assigned to each of the source UAV 110 and the target UAV 120 by the blockchain server 140 as per the contract or other agreement between a seller and a purchaser. During in-flight package transfer between the source UAV 110 and the target UAV 120, the participating drones can authenticate each other with the assigned key based on blockchain authentication performed by the remote blockchain server 140 which validates if the package is being transferred to correct drone or the correct package is to be collected from another drone. In the example of FIG. 1, the blockchain is stored and processed by the blockchain server 140, however, it should be appreciated that the blockchain may be stored by the control station 130, or one or more of the UAVs.

Upon successful authentication of the participating drones, the blockchain server 140 may gather various metadata associated with the in-flight transaction between the source UAV 110 and the target UAV 120, for example, one or more of geo-coordinates of each drone, altitude of each drone, specification of each drone, and the like. The metadata may be added to a shared public ledger stored at the remote blockchain server 140. In addition, the same metadata may be tracked throughout the entire journey of the parcel from seller or customer's location. Accordingly, during the authentication process between any pair of drones, the blockchain server 140 may also be validating the assigned keys, carrying capacity, area range travel permit of the drone (there can be location based restriction), health condition of the drones. As a result, in-flight package transfer may be initiated, preventing a hijacker from stealing packages in mid-air.

All drones in communication with the control station 130 can be identified uniquely by the blockchain server 140 such as through a tag, name, code, identifier, and the like. In addition, the blockchain server 140 may receive and store one or more of the geographical coordinates, altitude, battery power, and the like, for each drone. During communication with a UAV (e.g., source UAV 110 and target UAV 120) the drone data can be gathered through messages or other transmissions through the control station 130. In some embodiments, the control station 130 may be another drone such as another UAV. In some embodiments, the source UAV 110 and the target UAV 120 may also communicate directly based on proximity. The participating drones in any proximity surrounding may be sharing information with each other and can communicate. Therefore, both centralized and decentralized command, control and communications are possible. In some embodiments, the parcel 101 itself may include a blockchain storable component (such as a barcode, SKU, RFID, etc.), thus part of the blockchain function may be to track when the package leaves the source UAV 110 and is received by the target UAV 120.

If the target UAV 120 is having any mechanical or electrical problems, or it does not have enough battery power, the blockchain server 140 may determine that the target UAV 120 is not authorized to carry the parcel 101 because there is a chance the condition of the UAV might lead to damage to the parcel 101. In this case, the blockchain server 140 may ensure that the parcel 101 remains on the safest drone. Accordingly, if an insurance company can validate parcel damage because a bad drone was carrying the package, and can also validate which drone provider has provided the bad drone, the insurance company can assign blame for the damage in a transparent manner.

In some embodiments, the delivering drone (i.e., the source UAV 110) may be a smaller drone capable of carrying one parcel or a predetermined number of parcels. In this example, the target UAV 120 may be a heavy duty drone capable of carrying a larger amount of parcels provided by multiple smaller duty drones. For example, multiple small drones may transfer parcels to one larger heavy duty drone to optimize travel costs. In this example, the blockchain server 140 may ensure the packages are delivered to the correct heavy duty drone. Blockchain data can also be used for cost model calculation such as profit sharing. For example, a smaller duty drone may only travel ⅓ of a total distance while a heavy duty drone may travel ⅔ of the total distance. Here, profit between the delivery companies may be based on the travel distance of each of their respective drones. Accordingly, the blockchain server 140 may ensure the exact travel distance of each drone on the route. As another example, insurance during transportation (from one drone to another drone) can also be calculated accordingly. In this example, the blockchain server 140 may ensure the distance traveled and accordingly the insurance cost. For example, transfer from multiple smaller drones to a larger heavy duty drone could be to optimize the travel cost, a weather condition such as windy weather in which a smaller drone may not be safe, and the like.

The blockchain server 140 may also provide some form of real-time visibility of a status for all drones and packages that are out on delivery for a drone service provider. This solution can be conventional and/or mobile. In addition, an ancillary or collateral business for drone service providers is to sell camera or Internet of Things (IoT) sensor data to interested parties. For example, service drones could be outfitted with various IoT sensors to track local weather, or cameras which could be directed to take shots of traffic. As a result, an entity or a person may receive access to "public domain" camera/sensor data.

Because the source UAV 110 and the target UAV 120 are capable of transferring parcels 101 in-flight, the drones do not have to land on the ground or other surface to transfer packages. The purpose of in-flight transfer of packages can be due to location various reasons, for example, permit of drone travel, available power, long distance travel, and the like. As per a purchase agreement, the supplier may be required to transport the product (e.g., parcel 101) to a customer location. In various embodiments, during the transportation two or more drones can be involved to collect, transfer, and deliver the parcel 101 in-flight. In some embodiments, the participating drones (e.g., source UAV 110 and target UAV 120) can be from the same organization or different organizations (e.g., multiple transporters). During the flight, each participating drone is executing the contract agreement.

The in-flight parcel transfer system 100 provides numerous benefits in comparison to traditional drone delivery systems. For example, each drone may be registered in the blockchain and may be identified uniquely. The blockchain may further store and track a drone specification of each participating drone. Sensors installed (IoT) in each drone may be used to identify the health condition, available battery power, rotor condition, and the like, and feedback the data to blockchain server 140 storing the blockchain. During a package transfer event, the blockchain server 140 may identify the route using area based permits of drone travel, and accordingly may determine situations in which two or more drones are required for route. When a parcel is to be transported with multiple drones, the blockchain server 140 may assign keys to the participating drones. During in-flight package transfer, the target drone may be coming towards (i.e., within a predetermined proximity to) the source drone, and the authentication process may be started by the blockchain server 140 automatically based on a detected proximity or based on a request from one or more of the source and target drones. When the authentication process is successful, the in-flight package transfer may be initiated. A smart contract (e.g., computerized transaction protocol) associated with the blockchain server 140 may be used to process the drone in-flight transfer transactions to facilitate the transfer process by verifying that conditions of requests can be satisfied.

Figure 2:
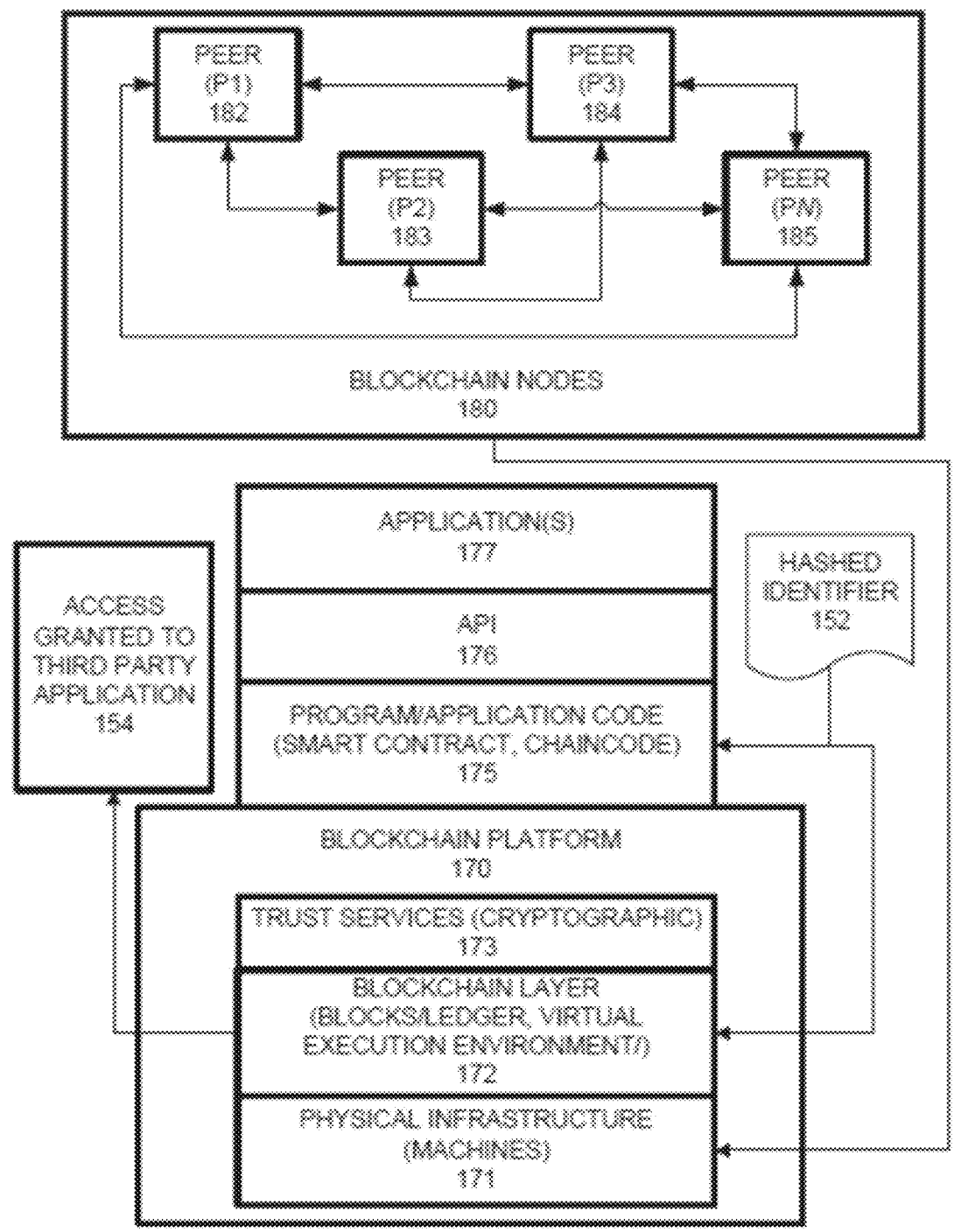
FIG. 2 is a diagram illustrating a blockchain system configuration in accordance with an example embodiment.

FIG. 2 illustrates a blockchain system database configuration, according to example embodiments. Referring to FIG. 2, blockchain system 200 may include certain common blockchain elements, for example, a group 180 of assigned peer blockchain nodes 182-185 which participate in blockchain transaction addition and validation process (consensus). As an example, the remote blockchain server 140 shown in FIG. 1 may be one of the peer blockchain nodes. Any of the blockchain peer nodes 180 may initiate an in-flight blockchain authentication and seek to write to a blockchain immutable ledger 172, a copy of which is stored on the underpinning physical infrastructure 171. In this configuration, the customized blockchain configuration may include one or applications 177 which are linked to application programming interfaces (APIs) 176 to access and execute stored program/application code (e.g., chain code and/or smart contracts) 175, which are created according to the customized configuration sought by the participants and can maintain their own state, control its own assets, and receive external information. This code can be deployed as a transaction and installed, via appending to the distributed ledger, on all blockchain peer nodes.

The blockchain base or platform 170 may include various layers of blockchain data, services (e.g., cryptographic trust services, virtual execution environment), and underpinning physical computer infrastructure necessary to receive and store new transactions and provide access to auditors which are seeking to access data entries. The blockchain layer 172 may expose an interface that provides access to the virtual execution environment necessary to process the program code and engage the physical infrastructure 171. Cryptographic trust services 173 may be used to verify transactions such as asset exchange transactions and keep information private.

The blockchain configuration of FIG. 2 may process and execute program/application code 175 by way of one or more interfaces exposed, and services provided, by blockchain platform 174. The code may control blockchain assets. For example, the code can store and transfer data, and may be executed by the blockchain in the form of a smart contract and associated chain code with conditions or other code elements subject to its execution. The smart contracts 175 may be created to execute reminders, updates, and/or other notifications subject to the changes, updates, etc. The smart contracts can themselves be used to identify rules associated with authorization and access requirements and usage. For example, hashed identifier information 152 received from a user device may be processed by one or more processing entities (virtual machines) included in the blockchain layer 172. The result may include access being granted 154 to a third party application from the blockchain computing environment (VM). In this example, the previously known user identifiers or data template information may be stored in the blockchain platform 170. The physical machines 171 may be accessed to retrieve the user device template and the information can be used to match against incoming user identifiers for verification purposes.

Within chaincode, a smart contract may be created via a high-level application and programming language, then converted to a string that is written to a block in the blockchain. The smart contract may be invoked by a user device submitted operation or as further described herein, by a broker agent. The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. In operation, a drone or other device associated with a seller or buyer of a parcel may submit a service request and that service request triggers smart contract authentication routine via chaincode. The drone may provide a unique identifier (e.g., tag, code, name, etc.) The details of this identifier may be extracted via a feature extractor and may be mapped to data in data template, which is then transformed to a hash. The hash is then transmitted to the blockchain and/or smart contract. The chaincode receives the hash and retrieves from the blockchain a hash associated with the data template created by use of a previously stored drone identifier and feature extractor. If the hashes of the hash identifier and the hash created from the stored identifier template data match, then the chaincode sends an authorization key to the requested service. The chaincode may write to the blockchain data including the following and associated cryptographic details: time stamp for the authorization, identification of the drones, carrying capacity of the drones, area range travel permit of the drones, health condition of the drones, and the like.

FIG. 3 illustrates a blockchain authentication process 300 between UAVs in accordance with an example embodiment. In this example, a source UAV 10 and a target UAV 20 communicate with a blockchain server 30 via one or more control stations (not shown) to perform an in-flight parcel transfer between the source UAV 10 and the target UAV 20 based on a blockchain authentication performed by the blockchain server 30. Referring to FIG. 3, in 301, one or more of the source UAV 10 and the target UAV 20 send a request to the blockchain server 30 to request authentication. For example, the request may include a request message requesting blockchain authentication. As another example, the request may include a GPS coordinate beacon indicating a geolocation of the respective UAV. In this latter example, the blockchain server 30 may determine whether the source UAV 10 and the target UAV 20 are within a predetermined proximity of each other.

In response to the request, or in response to the determination that the UAVs are within a predetermined proximity from one another, the blockchain server performs a blockchain authentication process, in 302. In this example, the participating UAVs can authenticate each other using one or more keys assigned by the blockchain server 140 prior to the parcel transfer. The keys may be provided in the requests 301. Here, the blockchain server 30 may perform the blockchain authentication to validate if the package is being transferred to a correct drone or a correct package is being collected from another drone. In response to a successful authentication, in 303 the blockchain server 30 can initiate the parcel transfer by sending transfer initiation messages to one or more of the source UAV 10 and the target UAV 20.

In addition to the authentication process, the source UAV 10 and/or the target UAV 20 may provide in-flight metadata (e.g., periodically, randomly, continuously, etc.) to the blockchain server 30, in 304. The in-flight metadata may include one or more of a travel distance, an altitude, a drone specification, a carrying capacity, a drone health, a battery life, and the like. Here, the blockchain server may update a shared public ledger with the received in-flight metadata in 305 to further enhance the security of in-flight parcel transfers by adding drone flight information about the specific flight for the delivery to the shared ledger recording the delivery.

Figure 4A:
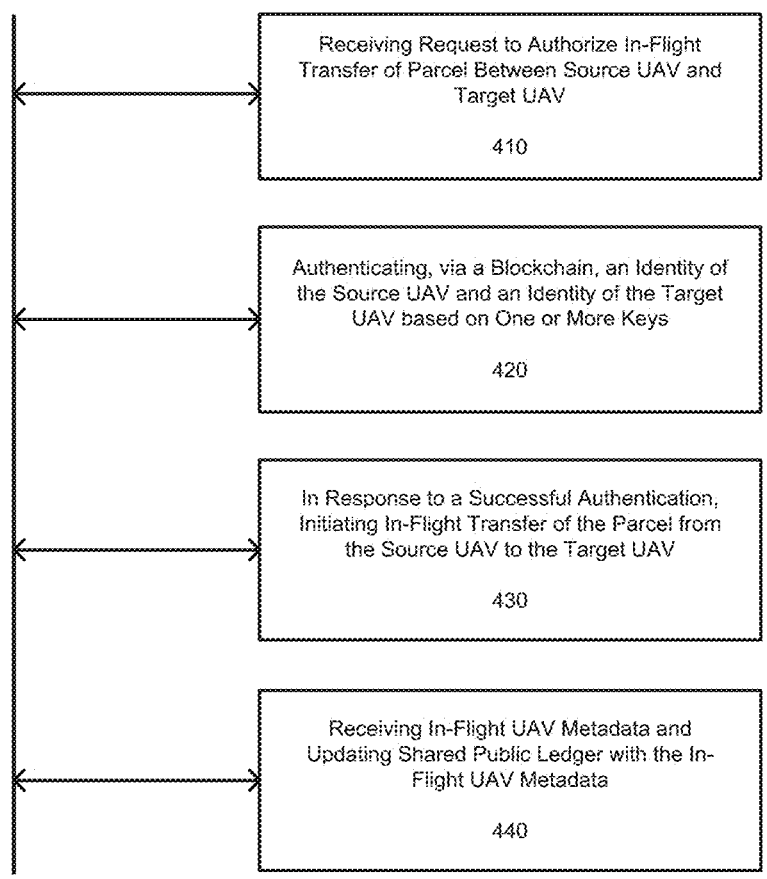
FIG. 4A is a diagram illustrating a method of managing blockchain authentication for in-flight transfer of parcels in accordance with an example embodiment.

FIG. 4A illustrates a method 400 of managing blockchain authentication for in-flight transfer of parcels in accordance with an example embodiment. For example, the method 400 may be performed by a blockchain host device such as the blockchain server 140 shown in FIG. 1, or another device such as a control station, drone, or the like. Referring to FIG. 4A, in 410, the method includes receiving a request to authorize an in-flight transfer of a parcel between a source UAV and a target UAV. The request may be a message from one or more of the source UAV and the target UAV that provides a geo-location of the UAV, an altitude, a health, a carrying capacity, a specification, and the like.

Based on the received request in 410, the blockchain server may determine that the source UAV and the target UAV are within a predetermined proximity (i.e., in-flight distance) to one another and perform an authentication.

Accordingly, in 420 the method includes authenticating, via a blockchain, an identity of the source UAV and an identity of the target UAV based on one or more predefined keys included in the request. For example, the authenticating may include validating, via the blockchain, a private key of the source UAV and a private key of the target UAV based on a contract between a seller and a purchaser of the parcel. In some embodiments, the authenticating may further include validating, via the blockchain, one or more of a carrying capacity of the target UAV, a travel permission of the target UAV, and a health of the target UAV.

Furthermore, in response to the blockchain authentication being successful, in 430 the method includes initiating delivery of the parcel from the source UAV to the target UAV while one or more of the source UAV and the target UAV are in-flight. Here, the initiating may include transmitting an authorization to one or more of the source UAV and the target UAV instructing them to perform transfer of the parcel while both the source UAV and the target UAV are in-flight.

In some embodiments, in 440, the method may further include receiving metadata of one or more of the source UAV and the target UAV during the in-flight transfer of the parcel, and storing the collected metadata in a shared blockchain ledger. For example, the metadata stored in the shared blockchain ledger may include one or more of a geographical location of the source UAV and the target UAV during the in-flight transfer, an altitude of the source UAV and the target UAV during the in-flight transfer, and a UAV specification of the source UAV and the target UAV. Here, the metadata may be collected by one or more on-board sensors of the source UAV and the target UAV which are configured t one or more of available battery power, rotor condition, and maintenance schedule, during flight.

Figure 4B:
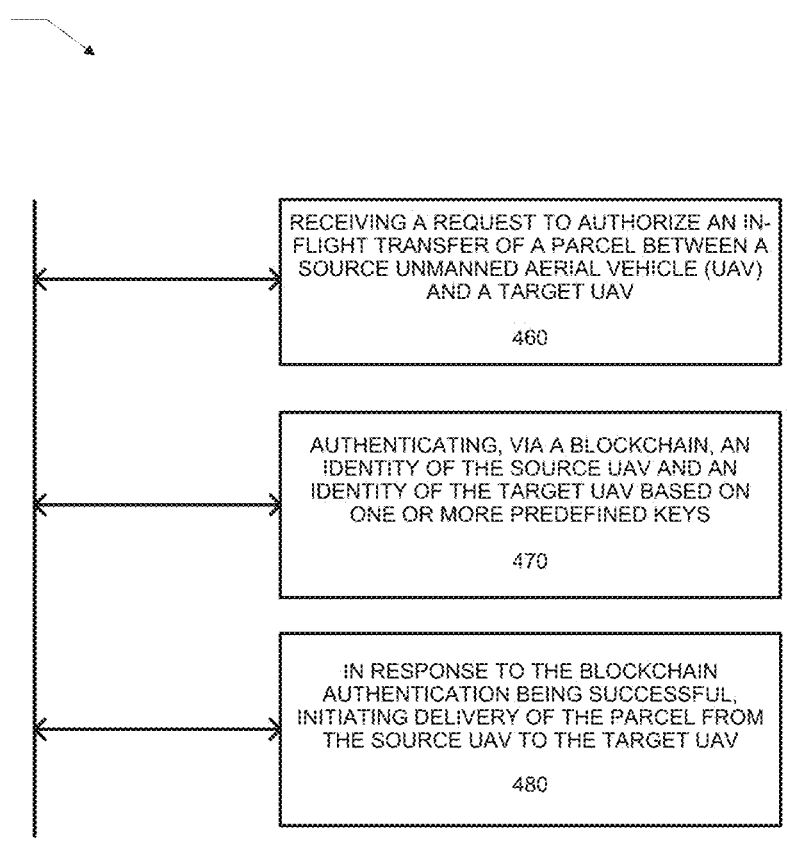
FIG. 4B is a diagram illustrating another method of managing blockchain authentication for in-flight transfer of parcels in accordance with an example embodiment.

FIG. 4B illustrates method 450 of managing blockchain authentication for in-flight transfer of parcels in accordance with an example embodiment. For example, the method 450 may be performed by a blockchain host device such as the blockchain server 140 shown in FIG. 1, or another device such as a control station, drone, or the like. Referring to FIG. 4B, the method may include one or more of receiving a request to authorize an in-flight transfer of a parcel between a source unmanned aerial vehicle (UAV) and a target UAV 460, authenticating, via a blockchain, an identity of the source UAV and an identity of the target UAV based on one or more predefined keys included in the request 470, and in response to the blockchain authentication being successful, initiating delivery of the parcel from the source UAV to the target UAV while one or more of the source UAV and the target UAV are in-flight 480.

Figure 5:
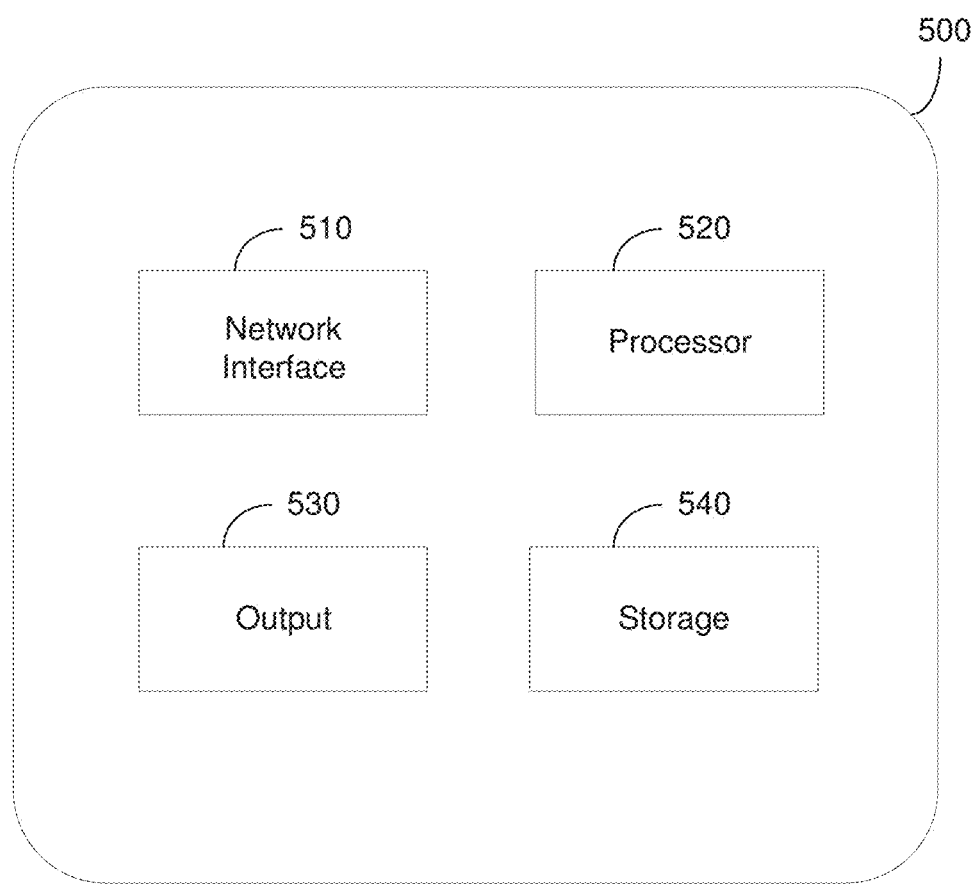
FIG. 5 is a diagram illustrating a computing device for managing blockchain authentication for in-flight transfer of parcels in accordance with an example embodiment.

FIG. 5 illustrates a computing device 500 for managing blockchain authentication for in-flight transfer of parcels in accordance with an example embodiment. For example, the computing device 500 may be the blockchain server 140 shown in FIG. 1, or another server, drone, device, control station, and the like. Also, the computing device 500 may perform the method 400 of FIG. 4A. Referring to FIG. 5, the computing device 500 includes a network interface 510, a processor 520, an output 530, and a storage device 540. The network interface 510 may transmit and receive data via the Internet, a private network, a public network, and the like. The network interface 510 may be a wireless interface, a wired interface, or the like. The processor 520 may include one or more processing devices each including one or more processing cores. In some examples, the processor 520 is a multicore processor or a plurality of multicore processors. The output 530 may output data to an embedded display of the device 500, an externally connected display, a cloud platform, and the like. The storage device 540 is not limited to any kind of storage device and may include any known memory device such as RAM, ROM, hard disk, and the like. The storage 540 may store a blockchain as described herein for in-flight parcel transfer authentication and the processor 520 may execute contracts based on the stored blockchain.

The network interface 510 may receive messages from UAVs. For example, the network interface 510 may receive a request to authorize an in-flight transfer of a parcel between a source unmanned aerial vehicle (UAV) and a target UAV. The processor 520 may authenticate, via the blockchain, an identity of the source UAV and an identity of the target UAV based on one or more predefined keys included in the request. In response to the blockchain authentication being successful, the processor 520 may control the network interface 510 to transmit a message to one or more of the source UAV and the target UAV to initiate delivery of the parcel from the source UAV to the target UAV while one or more of the source UAV and the target UAV are in-flight.

During the authentication, the processor 520 may validate, via the blockchain, a private key of the source UAV and a private key of the target UAV based on a contract between a seller and a purchaser of the parcel. In some embodiments, the processor 520 may further validate, via the blockchain, one or more of a carrying capacity of the target UAV, a travel permission of the target UAV, and a health of the target UAV. Prior to, during, and after the authentication process, the network interface 510 may receive metadata of one or more of the source UAV and the target UAV associated with the in-flight transfer of the parcel, and the processor 520 may store the collected metadata in a shared blockchain ledger which is included in storage device 540 or an external storage (not shown). The metadata stored in the shared blockchain ledger comprises one or more of a geographical location of the source UAV and the target UAV during the in-flight transfer, an altitude of the source UAV and the target UAV during the in-flight transfer, and a UAV specification of the source UAV and the target UAV.

As an alternative authentication, the system described herein may not use or may additionally use another attribute to perform authentication such as authenticating a route of the source UAV and the target UAV in order to authorize parcel transfer in-flight. For example, the system (e.g., computing system 500) may receive a request to authorize an in-flight transfer of a parcel between a source UAV and a target UAV, and authenticate a route of the source UAV and a route of the target UAV based on one or more predefined routes, and in response to the routes being authenticated as being on the correct route, initiating delivery of the parcel from the source UAV to the target UAV while one or more of the source UAV and the target UAV are in-flight.

Figure 6:
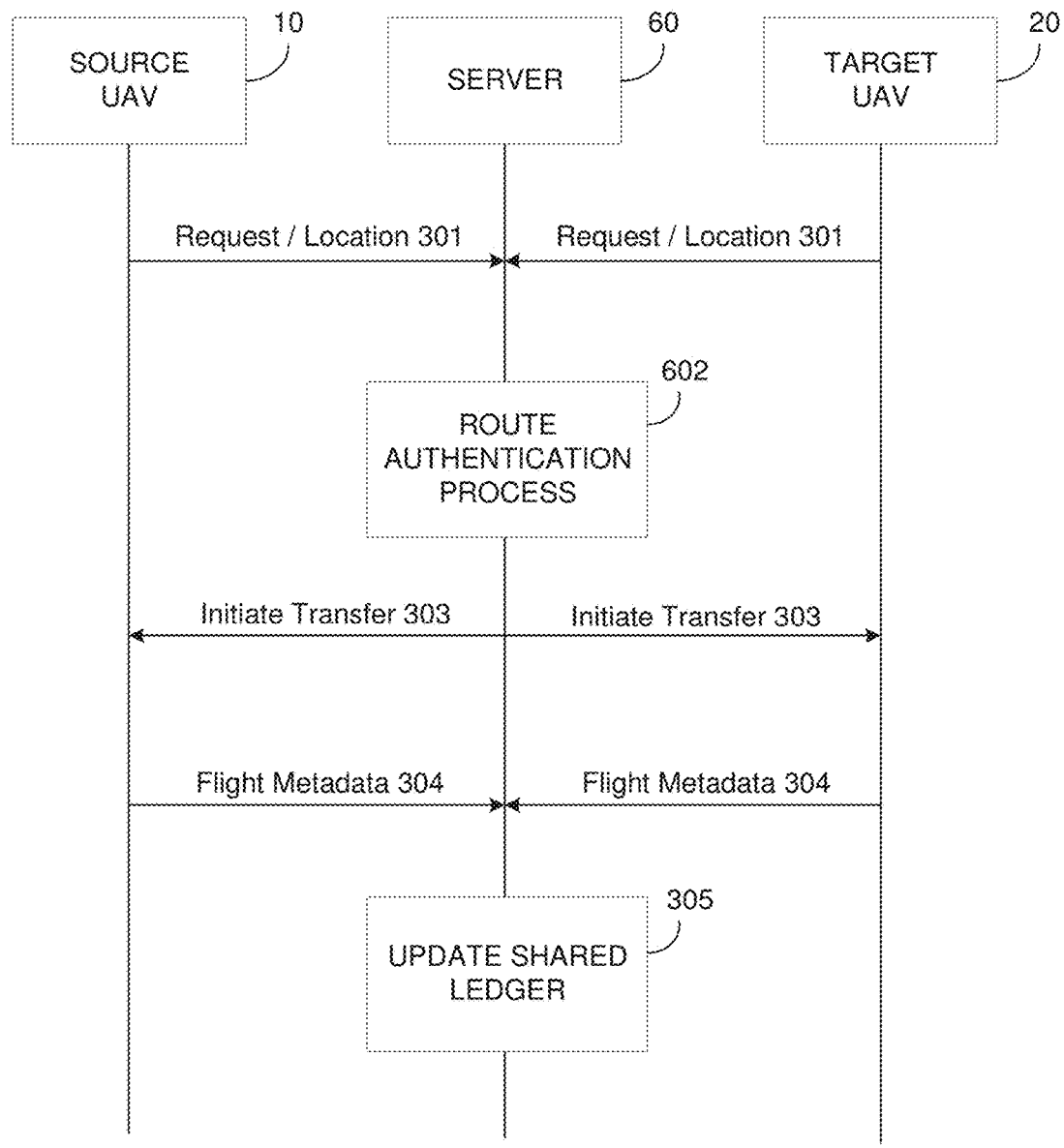
FIG. 6 is a sequence diagram illustrating a blockchain authentication process between UAVs in accordance with another example embodiment.

FIG. 6 illustrates a blockchain authentication process 600 between UAVs in accordance with another example embodiment. The process 600 of FIG. 6 is similar to the process 300 shown in the example of FIG. 3 and includes some similar steps such as receiving a request and a location of the source UAV 10 and the target UAV 30 in 301, initiating a transfer in 303, receiving metadata in 304, and updating a shared ledger in 305. However, in this example, rather than perform blockchain authentication to determine whether to transfer the parcel between the source UAV 10 and the target UAV 30, the server 60 authenticates a route of one or more of the source UAV and the target UAV, in 602. For example, the route may be authenticated based on one or more predefined routes stored by server 60 (which may or may not be a blockchain server). The route may also be authenticated based on GPS coordinates or other location coordinates (e.g., beacon signals, etc.) provided from the UAV's as well as wind speed, weather conditions, and the like which are detected by the server 60. In this example, the server 60 may receive data from the source and target UAVs and determine whether they are on the correct routes for a parcel delivery in-flight and authenticate the transfer of the parcel when the routes are determined to be correct.

Although an exemplary embodiment of one or more of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via one or more of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

The invention claimed is:

1. A method, comprising:
receiving a request to authorize an in-flight transfer of a parcel between a source unmanned aerial vehicle (UAV) and a target UAV;
authenticating, via a blockchain, an identity of the source UAV and an identity of the target UAV based on one or more predefined keys included in the request; and
in response to the blockchain authentication being successful, initiating delivery of the parcel from the source UAV to the target UAV while one or more of the source UAV and the target UAV are in-flight.

2. The method of claim 1, wherein the authenticating comprises validating, via the blockchain, a private key of the source UAV and a private key of the target UAV based on a contract between a seller and a purchaser of the parcel.

3. The method of claim 2, wherein the authenticating further comprises validating, via the blockchain, one or more of a carrying capacity of the target UAV, a travel permission of the target UAV, and a health of the target UAV.

4. The method of claim 1, further comprising receiving metadata of one or more of the source UAV and the target UAV during the in-flight transfer of the parcel, and storing the collected metadata in a shared blockchain ledger.

5. The method of claim 4, wherein the metadata stored in the shared blockchain ledger comprises one or more of a geographical location of the source UAV and the target UAV during the in-flight transfer, an altitude of the source UAV and the target UAV during the in-flight transfer, and a UAV specification of the source UAV and the target UAV.

6. The method of claim 4, wherein the metadata is collected by one or more on-board sensors of the source UAV and the target UAV which are configured to capture one or more of available battery power, rotor condition, and maintenance schedule, during flight.

7. The method of claim 1, wherein the authenticating is performed in response to receiving an indication that the source UAV and the target UAV are within a predetermined in-flight distance from each other.

8. The method of claim 1, wherein the initiating comprises transmitting an authorization to perform transfer of the parcel to the source UAV and the target UAV while both the source UAV and the target UAV are in-flight.

9. A computing device comprising:
a network interface configured to receive a request to authorize an in-flight transfer of a parcel between a source unmanned aerial vehicle (UAV) and a target UAV; and
a processor configured to authenticate, via a blockchain, an identity of the source UAV and an identity of the target UAV based on one or more predefined keys included in the request,
wherein, in response to the blockchain authentication being successful, the processor is further configured to control the network interface to transmit a message to one or more of the source UAV and the target UAV to initiate delivery of the parcel from the source UAV to the target UAV while one or more of the source UAV and the target UAV are in-flight.

10. The computing device of claim 9, wherein the processor is configured to validate, via the blockchain, a private key of the source UAV and a private key of the target UAV based on a contract between a seller and a purchaser of the parcel.

11. The computing device of claim 10, wherein the processor is further configured to validate, via the blockchain, one or more of a carrying capacity of the target UAV, a travel permission of the target UAV, and a health of the target UAV.

12. The computing device of claim 9, wherein the network interface is further configured to receive metadata of one or more of the source UAV and the target UAV during the in-flight transfer of the parcel, and the processor is configured to store the collected metadata in a shared blockchain ledger.

13. The computing device of claim 12, wherein the metadata stored in the shared blockchain ledger comprises one or more of a geographical location of the source UAV and the target UAV during the in-flight transfer, an altitude of the source UAV and the target UAV during the in-flight transfer, and a UAV specification of the source UAV and the target UAV.

14. The computing device of claim 12, wherein the metadata is collected by one or more on-board sensors of the source UAV and the target UAV which are configured to capture one or more of available battery power, rotor condition, and maintenance schedule, during flight.

15. The computing device of claim 9, wherein the processor is configured to perform the authenticating in response to receiving an indication that the source UAV and the target UAV are within a predetermined in-flight distance from each other.

16. The computing device of claim 9, wherein the processor is configured to control the network interface to transmit an authorization to perform transfer of the parcel to the source UAV and the target UAV while both the source UAV and the target UAV are in-flight.

17. A non-transitory computer readable medium having stored therein program instructions that when executed cause a computer to perform a method comprising:
receiving a request to authorize an in-flight transfer of a parcel between a source unmanned aerial vehicle (UAV) and a target UAV;
authenticating, via a blockchain, an identity of the source UAV and an identity of the target UAV based on one or more predefined keys included in the request; and
in response to the blockchain authentication being successful, initiating delivery of the parcel from the source UAV to the target UAV while one or more of the source UAV and the target UAV are in-flight.

18. The non-transitory computer readable medium of claim 17, wherein the authenticating comprises validating, via the blockchain, a private key of the source UAV and a private key of the target UAV based on a contract between a seller and a purchaser of the parcel.

19. The non-transitory computer readable medium of claim 17, wherein the authenticating further comprises validating, via the blockchain, one or more of a carrying capacity of the target UAV, a travel permission of the target UAV, and a health of the target UAV.

20. The non-transitory computer readable medium of claim 17, wherein the method further comprises receiving metadata of one or more of the source UAV and the target UAV during the in-flight transfer of the parcel, and storing the collected metadata in a shared blockchain ledger.

* * * * *